(12) United States Patent
Oh et al.

(10) Patent No.: US 11,986,790 B2
(45) Date of Patent: May 21, 2024

(54) METHOD FOR PREPARING MICROCAPSULES

(71) Applicants: LG Household & Health Care Ltd., Seoul (KR); LG Chem, Ltd., Seoul (KR)

(72) Inventors: Jung Whan Oh, Daejeon (KR); Kyungon Cha, Daejeon (KR); Hyunju Kim, Daejeon (KR); Chanjoong Kim, Daejeon (KR); Jae Hoon Choe, Daejeon (KR)

(73) Assignees: LG Household & Health Care Ltd., Seoul (KR); LG Chem, Ltd., Seoul (KR)

( * ) Notice: Subject to any disclaimer, the term of this patent is extended or adjusted under 35 U.S.C. 154(b) by 859 days.

(21) Appl. No.: 17/051,391

(22) PCT Filed: Jul. 2, 2019

(86) PCT No.: PCT/KR2019/008067
§ 371 (c)(1),
(2) Date: Oct. 28, 2020

(87) PCT Pub. No.: WO2020/009438
PCT Pub. Date: Jan. 9, 2020

(65) Prior Publication Data
US 2021/0046444 A1  Feb. 18, 2021

(30) Foreign Application Priority Data

Jul. 2, 2018  (KR) .................. 10-2018-0076605
Jul. 2, 2019  (KR) .................. 10-2019-0079286

(51) Int. Cl.
*B01J 13/14*   (2006.01)
*B01J 13/02*   (2006.01)

(52) U.S. Cl.
CPC .................................. *B01J 13/14* (2013.01)

(58) Field of Classification Search
CPC ............ C11D 3/505; B01J 13/22; B01J 13/14
USPC .......................................................... 512/1
See application file for complete search history.

(56) References Cited

U.S. PATENT DOCUMENTS

| | | | |
|---|---|---|---|
| 2003/0118822 A1 | 6/2003 | Jahns et al. | |
| 2005/0163714 A1 | 7/2005 | Sukhishvili et al. | |
| 2008/0193761 A1 | 8/2008 | Naylor Rocha Gomes et al. | |
| 2011/0008427 A1 | 1/2011 | Biggs et al. | |
| 2011/0033513 A1 | 2/2011 | Lei et al. | |
| 2012/0309623 A1 | 12/2012 | Ahn et al. | |
| 2013/0064876 A1 | 3/2013 | Viladot Petit et al. | |
| 2013/0089590 A1 | 4/2013 | Hotz et al. | |
| 2015/0140050 A1 | 5/2015 | Hotz et al. | |
| 2016/0145459 A1 | 5/2016 | Klein et al. | |
| 2016/0166480 A1* | 6/2016 | Lei .................... | A61K 8/731 510/159 |
| 2016/0168507 A1 | 6/2016 | Ribaut et al. | |
| 2016/0168508 A1* | 6/2016 | Ribaut ............... | A61K 8/8152 424/401 |
| 2016/0327880 A1 | 11/2016 | Yoshida et al. | |
| 2016/0354749 A1 | 12/2016 | Wu et al. | |
| 2017/0368525 A1 | 12/2017 | Arfsten et al. | |

FOREIGN PATENT DOCUMENTS

| | | |
|---|---|---|
| CN | 105431225 A | 3/2016 |
| EP | 2674477 A1 | 12/2013 |
| EP | 2832440 A1 | 2/2015 |
| EP | 2832441 A1 | 2/2015 |
| JP | 2007514518 A | 6/2007 |
| JP | 2008537028 A | 9/2008 |
| JP | 2013534952 A * | 9/2013 |
| JP | 2013534952 A | 9/2013 |
| JP | 2015526530 A | 9/2015 |
| JP | 2015200047 A | 11/2015 |
| JP | 2016530982 A | 10/2016 |
| JP | 2016534159 A | 11/2016 |
| JP | 2016212264 A | 12/2016 |
| KR | 20130036002 A | 4/2013 |
| KR | 20160019549 A | 2/2016 |
| KR | 101843210 B1 | 3/2018 |

OTHER PUBLICATIONS

Hods et al, JP 2013-534952 Machine Translation, Sep. 9, 2013 (Year: 2013).*
Extended European Search Report including Written Opinion for Application No. 19831160.7 dated Feb. 17, 2021, pp. 1-8.
Binks et al., "Pickering emulsions stabilized by hydrophilic nanoparticles: in situ surface modification by oil," Soft Matter, Jul. 25, 2016, pp. 6858-6867, vol. 12.
International Search Report for Application No. PCT/KR2019/008067 dated Oct. 10, 2019, 3 pages.

* cited by examiner

*Primary Examiner* — Jessica Whiteley
(74) *Attorney, Agent, or Firm* — Lerner David LLP

(57) ABSTRACT

There is provided a method for preparing surface modified microcapsules that increase fiber adhesion of fragrance capsules, have excellent fragrance durability even after use, and are environmentally friendly due to biodegradation of ester groups, by preparing a pickering emulsion using inorganic nanoparticles and acrylic monomers comprising biodegradable ester groups, and then, preparing capsules through the polymerization thereof, and modifying the surface of the capsules with amine-based monomers.

18 Claims, 2 Drawing Sheets

[FIG. 1]
Example 1 – fragrance/silica-acryl resin Surface modified capsules
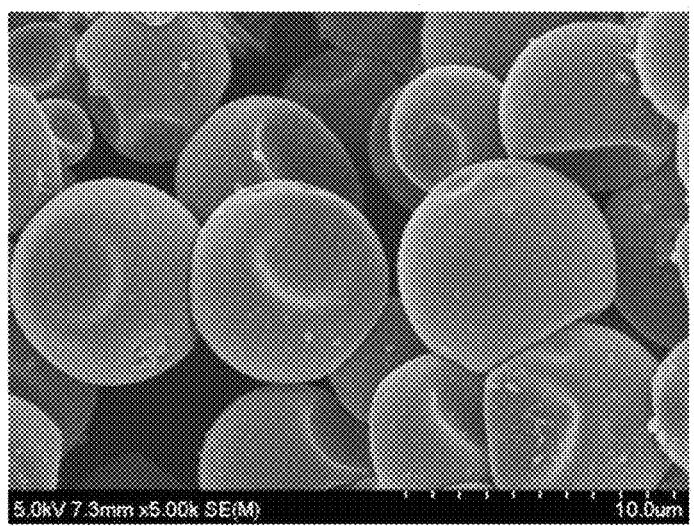

【FIG. 2】
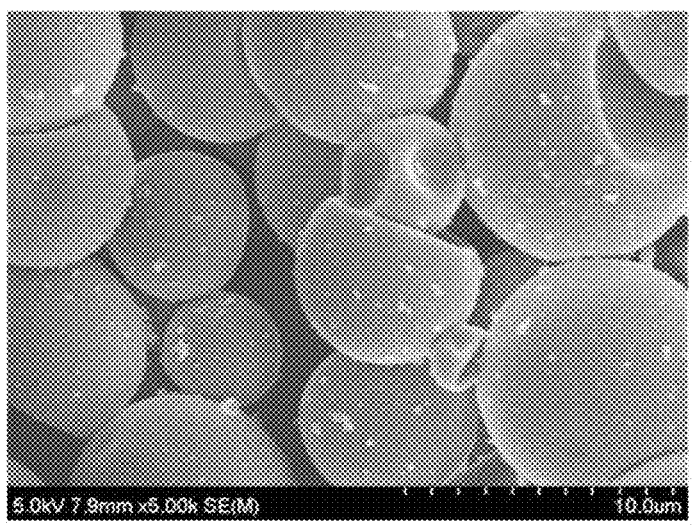
【FIG. 3】
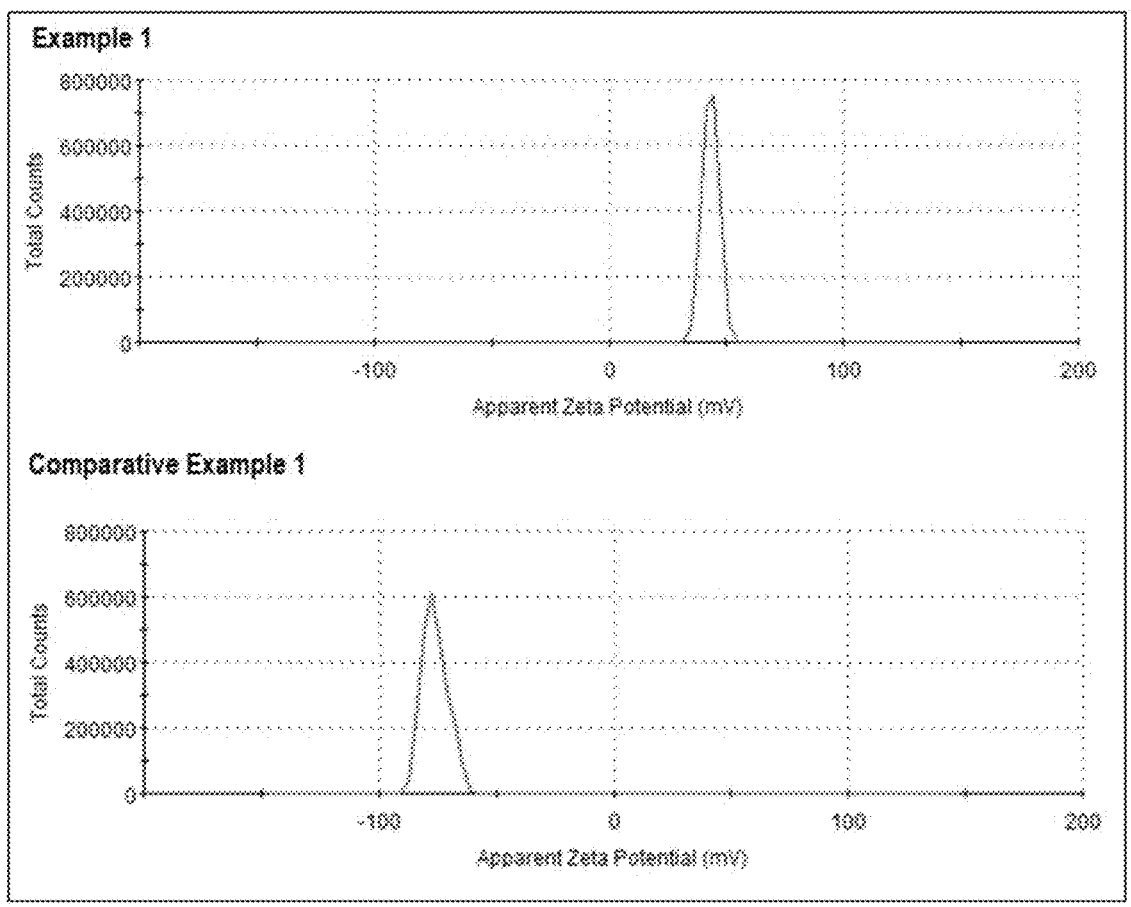

METHOD FOR PREPARING MICROCAPSULES

CROSS-REFERENCE TO RELATED APPLICATION(S)

This application is a national phase entry under 35 U.S.C. § 371 of International Application No. PCT/KR2019/008067 filed Jul. 2, 2019, which claims priority from Korean Patent Application No. 10-2018-0076605 filed Jul. 2, 2018, and Korean Patent Application No. 10-2019-0079286 filed Jul. 2, 2019, all of which are incorporated herein by reference.

TECHNICAL FIELD

The invention relates to a method for preparing environmentally friendly microcapsules that can increase fiber adhesion of fragrance capsules, and are not swollen in water, and thus, have excellent fragrance supporting force, and have excellent fragrance durability even after use, due to improved biodegradability.

BACKGROUND ART

Microcapsules are used in various fields. For example, they have various uses such as colorant, adhesive, flavoring, fuel, agricultural pesticide, biomaterial, drug, food, cosmetics, daily necessities, detergent, and the like.

Among them, fragrance oil microcapsules used in drug, food, cosmetics, detergent, and the like (for example, hair rinse, body wash, fabric softener, and the like) should be harmless to humans, and should be biodegraded and environmentally friendly.

However, most of the previous methods prepare capsulate fragrance oil by forming emulsion liquid drops using surfactant polymer or nanoparticles, and then, conducting condensation polymerization of melamine-formaldehyde, urea, urethane, and the like on the surface of the emulsion fragrance liquid drops. Although the fragrance capsules thus prepared have excellent fragrance supporting force and supporting efficiency, the capsules are not degraded after use, thus causing an environmental problem.

In order to solve such a problem, there have been attempts to prepare fragrance microcapsules using biopolymer (gum arabic, starch, cellulose, gelatin, alginate, albumin, and the like) and modified biopolymer (ethyl cellulose, CMC, HPMC, HPMC-AS). However, since these polymers may be swollen by water or fragrance oil, they have very weak fragrance supporting force.

As another method, a method of preparing oil-in-water pickering emulsion using hydrophilic silica nanoparticles and dialkyl adipate has been suggested (Soft Matter, Pickering emulsions stabilized by hydrophilic nanoparticles: in situ surface modification by oil, Binks et al., 2016, 12, 6858 to 6867)

However, since the pickering emulsion thus prepared is vulnerable to surrounding environment such as acid, base, temperature, and the like, and thus, is easily destroyed, it may be difficult to prepare desired microcapsules and fiber adhesion of the fragrance capsules may be lowered.

DETAILED DESCRIPTION OF THE INVENTION

Technical Problem

It is an object of the invention to provide a method for preparing microcapsules that can increase fiber adhesion of fragrance capsules through the charge control of the surface of fragrance capsules, and are not swollen in water, and thus, have excellent fragrance supporting force, and due to improved biodegradability, have excellent fragrance durability even after use, and are environmentally friendly.

Technical Solution

According to one embodiment of the invention, there is provided a method for preparing microcapsules comprising the steps of:
  adsorbing acrylic monomers having water solubility of 1 to 100 g/L on the surface of inorganic nanoparticles (step 1);
  adding fragrance oil to the inorganic nanoparticles having acrylic monomers adsorbed on the surface, thus forming an emulsion (step 2); polymerizing the mixture of the step 2 (step 3); and
  adding amine-based monomers and an initiator to the polymerization solution of the step 3, thus progressing polymerization (step 4).

According to another embodiment of the invention, there is provided surface modified microcapsules prepared by the above method.

Advantageous Effects

There are provided inorganic nanoparticles-acryl resin complex microcapsules that can increase fiber adhesion of fragrance capsules through the charge control of the surface of fragrance capsules, and are not swollen in water, and thus, have excellent fragrance supporting force, and due to improved biodegradability, have excellent fragrance durability even after use, and are environmentally friendly.

BRIEF DESCRIPTION OF THE DRAWINGS

FIG. 1 shows the electron microscope image of the microcapsules of Example 1.

FIG. 2 shows the electron microscope image of the microcapsules of Reference Example 1.

FIG. 3 shows comparison between the measurement results of zeta potentials of Example 1 and Reference Example 1.

DETAILED DESCRIPTION OF THE EMBODIMENTS

Hereinafter, the invention will be explained in more detail. Although various modifications can be made to the present invention and the present invention may have various forms, specific examples will be illustrated and explained in detail below. However, it should be understood that these are not intended to limit the present invention to specific disclosure, and that the present invention includes all the modifications, equivalents or replacements thereof without departing from the spirit and technical scope of the invention.

As used herein, the term "comprise" is intended to designate the existence of practiced characteristic, number, step, constructional element or combinations thereof, and it is not intended to preclude the possibility of existence or addition of one or more other characteristics, numbers, steps, constructional elements or combinations thereof.

Hereinafter, a method for preparing microcapsules, and microcapsules prepared thereby according to specific embodiments of the invention will be explained.

In order to solve the problems of the prior art, a method for forming inorganic nanoparticles-acryl resin complex capsules is presented.

Acrylic monomers are adsorbed on the hydrophilic inorganic nanoparticles such as silica and a stable fragrance emulsion is formed by a pickering emulsion method, and then, inorganic nanoparticles-acryl resin microcapsules are prepared by radical polymerization by the initiation reaction of a radical initiator dissolved in fragrance, and then, amine-based monomers are additionally polymerized on the surface of the capsules to control the surface charge of the capsules, thereby increasing fiber adhesion of fragrance capsules.

And, the microcapsules crosslinked using the pickering emulsion are polyacrylate capsules, and the ester groups in the structure are biodegraded by hydrolysis, and thus, fragrance capsules environmentally friendly than before may be prepared.

Specifically, according to one embodiment of the invention, there is provided a method for preparing a microcapsule comprising the steps of:

adsorbing acrylic monomers having water solubility of 1 to 100 g/L on the surface of inorganic nanoparticles (step 1);

adding fragrance oil to the inorganic nanoparticles having acrylic monomers adsorbed on the surface, thus forming an emulsion (step 2);

polymerizing the mixture of the step 2 (step 3); and adding amine monomers and an initiator to the polymerization solution of the step 3, thus progressing polymerization (step 4).

Hereinafter, the invention will be explained in more detail.

In the step 1, acrylic monomers are adsorbed on the surface of hydrophilic inorganic nanoparticles.

Preferably, as the inorganic nanoparticles, any hydrophilic particles may be used. For example, the inorganic nanoparticles may be selected from the group consisting of silica, titania, metal oxide, noble metal, apatite, and limestone having an average particle diameter of 2 nm to 100 nm. More preferably, the average particle diameter of the inorganic nanoparticles may be 5 nm to 50 nm.

Most preferably, as the inorganic nanoparticles, silica or titania having an average particle diameter of 2 nm to 100 nm or 5 nm to 50 nm may be used.

And, in the step 2, the inorganic nanoparticles may be used in the state of an aqueous colloidal solution, and acrylic monomers are dispersed in the aqueous colloidal solution, and thus, when fragrance oil is added, a stable pickering emulsion may be formed.

Thus, the step 1 may comprise the steps of adding acrylic monomers using an aqueous silica colloidal solution, and dispersing them, to adsorb acrylic monomers on the surface of silica.

The dispersion method is not limited as long as it makes inorganic nanoparticles such as silica in the state of an aqueous colloidal solution, and for example, sonication may be used.

More specifically, for example, hydrophilic silica is used as inorganic nanoparticles.

Since acrylic monomers are adsorbed on the surface of hydrophilic silica by sonication, a fragrance pickering emulsion of inorganic nanoparticles (preferably, silica) is stably formed. And, silica-acrylate microcapsules may be prepared by radical polymerization of such stable pickering emulsion, by the initiation reaction of a radical initiator dissolved in fragrance.

Namely, acrylic monomers such as acrylate or diacrylate monomers are adsorbed on the surface of hydrophilic inorganic nanoparticles (silica nanoparticles), and a pickering emulsion of fragrance oil is formed, and then, capsules are immediately formed by free radical polymerization.

The acrylic monomers include biodegradable ester groups, have water solubility of 1 to 100 g/L, and may be used alone or in combination. The temperature condition of the water solubility may be based on room temperature of 25° C.

More preferably, acrylic monomers having water solubility of 5 to 60 g/L or 10 to 60 g/L may be used.

If the water solubility of acrylic monomers is 1 g/L or less, it may be difficult to adsorb acrylic monomers on the hydrophilic inorganic nanoparticles, and thus, a pickering emulsion cannot be formed. And, if the water solubility of acrylic monomers is 100 g/L or more, hydrophilicity of the surface of hydrophilic inorganic nanoparticles may be maximized, and contact angle between water/oil may become small, and thus, most of particle surfaces may exist as aqueous phases, and in this case, unstable emulsion may be formed.

Such acrylic monomers may include one or more selected from the group consisting of diacrylic monomers represented by the following Chemical Formula 1 and monoacrylic monomers represented by the following Chemical Formula 2:

[Chemical Formula 1]

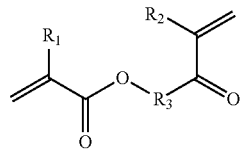

in the Chemical Formula 1, $R_1$ and $R_2$ are each independently, hydrogen or $-(CH_2)_nCH_3$ (n is an integer of 0 to 5), R is $-(CH_2CR_4H-O)_m$, $-(CH_2CR_4H)_mO$, or $-(CH_2CH(OH)CH_2-O)_m$ (m is an integer of 1 to 5), $R_4$ is hydrogen or $-(CH_2)_nCH_3$ (n is an integer of 0 to 5),

[Chemical Formula 2]

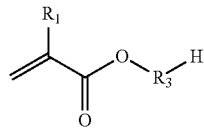

in the Chemical Formula 2, $R_1$ is hydrogen or $-(CH_2)_nCH_3$ (n is an integer of 0 to 5), $R_3$ is $-(CH_2CR_4H-O)_m$, $-(CH_2CR_4H)_mO$, or $-(CH_2CH(OH)CH_2-O)_m$ (m is an integer of 1 to 5), and $R_4$ is hydrogen or $-(CH_2)_nCH_3$ (n is an integer of 0 to 5).

Preferably, acrylic monomers having water solubility of 5 to 50 g/L may be used, as explained. Specific examples of such acrylic monomers may include one or more selected from the group consisting of dipropyleneglycol diacrylate, diethyleneglycol diacrylate, and tetraethyleneglycol dimethacrylate, as shown in the following Table 1.

TABLE 1

| Monomers | Water solubility (g/L) | Tg (° C.) |
|---|---|---|
| Dipropyleneglycol diacrylate (DPGDA) | 5.2 | 104 |
| Diethyleneglycole diacrylate (DEGDA) | 10-50 | 12 |
| Tetraethylene glycol Dimethacrylate (TeEGDMA) | 52 to 53 | −83 |

And, in the step 1, in case sonication is used to adsorb acrylic monomers on the surface of inorganic nanoparticles, it may be progressed as follows.

Specifically, the step 1 may comprise the steps of adding acrylic monomers using an aqueous colloidal solution of inorganic nanoparticles, and conducting sonication for 1 to 30 minutes, thus adsorbing acrylic monomers on the surface of inorganic nanoparticles. It is preferable that the sonication is progressed under low temperature condition such as an ice bath.

The inorganic nanoparticles may have an average particle diameter of 5 nm to 50 nm.

Meanwhile, in the step 2, to the inorganic nanoparticles prepared in the step 1, having acrylic monomers adsorbed on the surface, fragrance oil is added to form an emulsion.

The emulsion formed in the step 2 may be a pickering emulsion.

Specifically, the step 2 may comprise the step of adding fragrance oil to the inorganic nanoparticles having acrylic monomers adsorbed on the surface, and conducting sonication for 1 to 30 minutes, thus forming an oil-in-water (hereafter, O/W) pickering emulsion. It is preferable that the sonication is progressed under low temperature condition such as an ice bath.

When fragrance oil is used in the step 2, an oil soluble initiator may be dissolved in the fragrance oil.

The oil soluble initiator may be one or more selected from the group consisting of azo and peroxide initiators. The oil soluble initiator is in the form of powder, the amount used is not significantly limited as long as it can be dissolved in fragrance oil. And, commercially available products may be used.

Meanwhile, since inorganic nanoparticles, acrylic monomers and fragrance oil are added to an aqueous colloidal solution comprising water when preparing microcapsules, the contents of the inorganic nanoparticles, acrylic monomers and fragrance oil may be appropriately controlled, based on the total content of the pickering emulsion.

Preferably, before progressing polymerization, the pickering emulsion solution of the step 3 may be a solution comprising water, inorganic nanoparticles, acrylic monomers, and fragrance.

And, the pickering emulsion solution may comprise, based on the total content of the solution, 60 to 80 wt % of water, 0.1 to 16 wt % of inorganic nanoparticles, 0.2 to 25 wt % of acrylic monomers, and 2 to 36 wt % of fragrance.

If the content of the inorganic nanoparticles is less than 0.1 wt %, emulsion may be formed over 1000 μm, and if it is greater than 16 wt %, emulsion may be formed below 0.1 μm.

If the content of the acrylic monomers is less than 0.2 wt %, it may be impossible to form a pickering emulsion, or it may be impossible to form inorganic nanoparticles-acryl resin capsules, and if it is greater than 25 wt %, acrylic monomers that are not adsorbed on the inorganic nanoparticles and do not participate in the polymerization reaction may remain in the aqueous phase in a large quantity.

If the content of fragrance is less than 2 wt %, capsules may be too thick, and thus, fragrance may not be emitted, and if it is greater than 36 wt %, unstable emulsion may be formed, thus deteriorating the performance of capsules.

In the step 3, polymerization of the pickering emulsion obtained in the step 2 is progressed.

After a pickering emulsion is obtained by the above explained method, radical polymerization is progressed under certain conditions, thus synthesizing fragrance/inorganic nanoparticles-polyacrylate capsules.

Preferably, the polymerization of the step 3 may comprise the step of progressing radical polymerization of the O/W pickering emulsion at 30 to 90° C. for 6 to 20 hours to form microcapsules. And, during the polymerization, stirring condition may be 100 to 700 rpm, preferably 200 to 400 rpm. And, the polymerization may be progressed under inert conditions through nitrogen purging, and the like.

After the polymerization of the step 3, before progressing the step 4 described below, if necessary, concentration and/or drying processes may be additionally progressed, and the conditions are not limited.

The microcapsules obtained through the polymerization of the step 3 consist of inorganic nanoparticles, acrylic monomers, and fragrance.

And, the step 4 may comprise the steps of adding amine-based monomers and an initiator to the polymerization solution of the step 3, and conducting polymerization. In the step 4, amine-based monomers are additionally polymerized on the surface of capsules, to control the surface charge of the capsules, and thereby, fiber adhesion of the fragrance capsules may be improved.

In the step 4, the amine-based monomers and initiator may be introduced during the polymerization of the step 3, or after completing the polymerization. Preferably, in the step 4, at a time between the latter part of the polymerization of the step 3 and completion of the polymerization, additional amine-based monomers and initiator may be introduced into the polymerization solution of the step 3. The time between the latter part of the polymerization and completion of the polymerization means a time when the polymerization is completed about 80 to 100%, in the total polymerization time (6 to 20 hours).

It is preferable that the amine-based monomers include the amine-based monomers of the following Chemical Formula 3 or Chemical Formula 4.

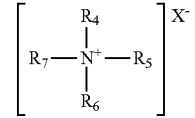

[Chemical Formula 3]

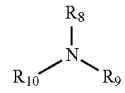

[Chemical Formula 4]

(in the Chemical Formulae 3 and 4, $R_4$ and $R_5$ may be identical to or different from each other, and are $-(CH_2)_n-(CH)=CH_2$ (n is an integer of 1 to 5) or $-(CH_2)n-CH_3$ (n is an integer of 0 to 5), $R_6$ and $R_7$ may be identical to or different from each other, and are $C_1$ to $C_5$ alkyl, $-(CH_2)n-CH=CH_2$ (n is an integer of 1 to 5), an acrylamide substituent of the following Chemical Formula a, or an acrylic acid substituent of the following Chemical Formula b, and both $R_6$ and $R_7$ are not $C_1$ to $C_5$ alkyl groups, X is a halogen, $R_8$ is hydrogen, —$(CH_2)_n$—(CH)=$CH_2$ (n is an integer of 1 to 5) or —$(CH_2)$n-$CH_3$ (n is an integer of 0 to 5), $R_9$ and $R_{10}$ may be identical to or different from each other, and are —$(CH_2)$n-CH=$CH_2$ (n is an integer of 1 to 5), an acrylamide substituent of the following Chemical Formula a, or an acrylic acid substituent of the following Chemical Formula b,

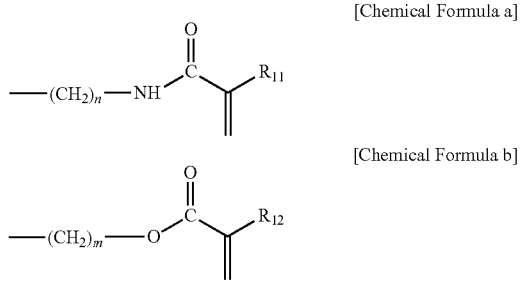

[Chemical Formula a]

[Chemical Formula b]

in the Chemical Formulas a and b, n and m are each independently, or simultaneously, integers of 1 to 5, and $R_{11}$ and $R_{12}$ are each independently, or simultaneously, hydrogen or —$(CH_2)_n$,$CH_3$ (n' is an integer of 0 to 5).

In the Chemical Formulae 3 and 4, $R_4$ to $R_6$ may be —$(CH_2)$n-$CH_3$ (n is an integer of 0 to 5), and $R_7$ may be the Chemical Formula a. Wherein, in the Chemical Formula a, n may be 2 to 3, $R_{11}$ may be —$(CH_2)_n CH_3$ (n' is an integer of 0 to 2, more preferably 0).

The $C_1$ to $C_5$ alkyl may include a linear or branched alkyl group.

As the amine-based monomers, a [3-(methacryloylamino)propyl]trimethylammonium chloride solution or a diallyldimethylammonium chloride solution may be preferably used.

The content of the amine-based monomers may be 0.2 to 5 parts by weight, based on 100 parts by weight of the total solution from the step 3. If the content of the amine-based monomers is 0.2 parts by weight or less, surface charge modification effect may decreased, and if it is 5 parts by weight or more, introduced monomers may be not only polymerized on the capsule surface, but also separately polymerized to form polymer particles.

And, the initiator used in the step 4 may be water soluble initiators, may be one or more selected from the group consisting of azo and peroxide initiators, and any water soluble initiators well known in the art may be used. For example, as the water soluble initiator, SPS (Sodium persulfate), APS (Ammonium persulfate), and the like may be used. The content of the water soluble initiator may be 0.004 to 0.03 parts by weight, based on 100 parts by weight of the total solution from the step 3.

The polymerization of the step 4 may comprise the step of progressing polymerization at 30 to 90° C. for 6 to 20 hours, to modify the surface of formed microcapsules. And, during the polymerization, stirring condition may be 100 to 700 rpm, preferably 200 to 400 rpm.

According to another embodiment of the invention, there are provided surface modified microcapsules prepared by the above method.

According to yet another embodiment, there are provided surface modified microcapsules comprising inorganic nanoparticles-acryl resin complex and a fragrance component, wherein the surface of the microcapsule is modified with an amine-based compound, and the surface charge has a zeta potential of +5 to 60 mV.

Specifically, the microcapsules provided herein mean fragrance capsules of which surfaces are modified with an amine-based compound, and comprise surface modified inorganic nanoparticles-acryl resin complex microcapsules containing a fragrance component, and the zeta potential may be about +5 to 60 mV or +10 to 55 mV or +30 to 50 mV. Such microcapsules may be obtained by surface modification with an amine-based compound, and the zeta potential is the result obtained by measuring apparent zeta potential of each microcapsule 10 times, using Malvern zetasizer equipment and disposable folded capillary cell (Malvern DTS 1070).

And, the microcapsules may comprise, based on the total weight of the surface modified fragrance capsules, 0.5 to 40 wt % of inorganic nanoparticles, 1 to 60 wt % of acrylic monomers, 0.02 to 15 wt % of amine-based monomers, and 10 to 90 wt % of fragrance.

And, the surface modified microcapsules may be provided in the form of surface modified inorganic nanoparticles-acryl resin complex capsules containing a fragrance component and having an average particle diameter of 0.1 μm to 1000 μm.

Particularly, the surface modified inorganic nanoparticles-acryl resin complex microcapsules are not swollen in water, and thus, have excellent fragrance supporting force, and are environmentally friendly because the ester groups are biodegraded.

Hereinafter, the actions and effects of the invention will be explained in detail through specific examples. However, these examples are presented only as the illustrations of the invention and the scope of the right of the invention is not limited thereby.

Example 1

Step 1

0.4 g of hydrophilic silica (25 nm) was dispersed in 50 ml of water to prepare an aqueous colloidal silica solution, and then, 3 g of diethyleneglycol diacrylate having water solubility of about 25 g/L was added, and the mixture was sonicated in an ice bath for 20 minutes, thus adsorbing acrylic monomers on the surface of silica.

Step 2

Thereafter, 20 g of fragrance oil in which an oil soluble initiator was dissolved was introduced in the solution, and the mixture was sonicated again in an ice bath for 20 minutes, thus preparing a pickering emulsion.

Step 3

Subsequently, the solution was introduced into a three neck round bottom flask connected to a condenser, and the flask was sealed, and then, $N_2$ bubbling was conducted about 30 minutes while stirring at 300 rpm, and radical polymerization was progressed in an oil bath heated to 60° C. for 20 hours to prepare fragrance/silica-acrylate microcapsules.

Step 4

During the polymerization of the step 3, 0.01 g of a water soluble initiator (APS (Ammonium persulfate)) and 0.6 g of a [3-(methacryloylamino)propyl]trimethylammonium chloride solution were introduced and polymerization was further progressed for 15 hours to prepare surface modified fragrance/silica-acryl resin microcapsules.

Example 2

Surface modified fragrance/silica-acrylate microcapsules were prepared by the same method as Example 1, except that 0.5 g of a diallyldimethylammonium chloride solution was used instead of the [3-(methacryloylamino)propyl]trimethylammonium chloride solution in the step 4.

Reference Example 1

Step 1

0.4 g of hydrophilic silica (25 nm) was dispersed in 50 ml of water to prepare an aqueous colloidal silica solution, and then, 3 g of diethyleneglycol diacrylate having water solubility of about 25 g/L was added, and the mixture was sonicated in an ice bath for 20 minutes, thus adsorbing acrylic monomers on the surface of silica.

Step 2

Thereafter, 20 g of fragrance oil in which an oil soluble initiator was dissolved was introduced in the solution, and the mixture was sonicated again in an ice bath for 20 minutes, thus preparing a pickering emulsion.

Step 3

Subsequently, the solution was introduced into a three neck round bottom flask connected to a condenser, and the flask was sealed, and then, $N_2$ bubbling was conducted about 30 minutes while stirring at 300 rpm, and radical polymerization was progressed in an oil bath heated to 60° C. for 20 hours to prepare fragrance/silica-acrylate microcapsules.

Comparative Example 1

To an aqueous colloidal silica solution containing silica having an average particle diameter of 20 nm, 20 g of fragrance oil was added to prepare an oil phase pickering emulsion.

In order to maintain a stable emulsion state, 1.6 g of styrene maleic anhydride copolymer (SMA) was added, and the pH of the solution was made to 4 to 6.

A pre-melamine formaldehyde (pre-MF) solution (pH 8.5 to 9) was slowly dropped thereto, and then, a temperature was raised to 50 to 70° C., and a reaction was conducted for about 3 hours to synthesize silica-MF microcapsules.

Comparative Example 2

A surfactant (tween80) was added to water-saturated ethyl acetate at the concentration of 1% to prepare an aqueous phase.

Ethyl cellulose (EC) was dissolved in ethyl acetate at the concentration of 20%, and fragrance oil was mixed therewith at the weight ratio of fragrance EC of 1:1 to prepare a core solution.

Into 100 ml of water-saturated ethyl acetate, 30 ml of the prepared core solution was introduced, and an emulsion was prepared using ultra turrax.

The prepared fragrance emulsion solution was heated to about 60° C., and stirred at 500 rpm to remove ethyl acetate, thus synthesizing fragrance/EC microcapsules.

Reference Example 2

Microcapsules were synthesized by the same method as Example 1, except that 0.1 g of the [3-(methacryloylamino)propyl]trimethylammonium chloride solution was used in the step 4.

Reference Example 3

Microcapsules were synthesized by the same method as Example 1, except that 3 g of the [3-(methacryloylamino)propyl]trimethylammonium chloride solution was used in the step 4.

Comparative Example 3

Step 1

1 g of hydrophilic silica (25 nm) was dispersed in 87.5 g of water to prepare an aqueous colloidal silica solution, and then, 10 g of (E-trimethylolpropane triacrylate (E-TMPTA) having water solubility of about 0.9 g/L was added, and the mixture was sonicated in an ice bath for 20 minutes.

Step 2

Thereafter, 20 g of fragrance oil in which an oil soluble initiator was dissolved was introduced in the solution, and the mixture was sonicated again in an ice bath for 20 minutes, thus preparing a pickering emulsion.

Step 3

Subsequently, the solution was introduced into a three neck round bottom flask connected to a condenser, and the flask was sealed, and then, $N_2$ bubbling was conducted about 30 minutes while stirring at 300 rpm, and radical polymerization was progressed in an oil bath heated to 60° C. for 20 hours, for the purpose of preparing fragrance/silica-acrylate microcapsules.

However, since E-TMPTA has low water solubility of 0.9 g/L, due to the formation of unstable emulsion, capsulation was not properly progressed.

Namely, it was confirmed that fragrance oil failing to form an emulsion floated after synthesis of capsules, and the shape of prepared capsules was not smooth.

Example 3

Fragrance/silica-acrylate microcapsules were prepared by the same method as Example 1, except using 2 g of tetraethyleneglycol dimethacrylate having water solubility of 52 g/L instead of diethyleneglycol diacrylate.

Experimental Example

For Examples 1 to 3, Comparative Examples and Reference Examples 1 to 3, the shape of the surface and fragrance supporting efficiency were evaluated, and the results were shown in the following Tables 2 and 3.

(1) Observation of Surface Shape and Measurement of Charge

The electron microscope images of the microcapsules of Example 1 and Reference Example 1 were taken, and the results was shown in FIGS. 1 and 2. And, using Malvern zetasizer equipment and disposable folded capillary cell (Malvern DTS 1070), apparent zeta potential was measured for each microcapsule 10 times, and the results were shown in FIG. 3.

As shown in FIGS. 1 and 2, fragrance capsules before surface modification (Reference Example 1) and fragrance capsules after surface modification (Example 1) were respectively prepared with size of about 5 um, and there was no difference in the shape before and after surface modification.

However, as shown in FIG. 3, silica-acryl resin fragrance capsules without surface modification exhibited zeta potential of about −76 mV, and the capsules surface modified with amine-based monomers exhibited zeta potential of about +43 mV.

Thus, it can be seen that surface charge of fragrance capsules significantly changed due to the surface polymerization of amine-based monomers, and the resulting fiber adhesion improvement effect was shown below.

(2) Evaluation of Fiber Adhesion

Assuming that fragrance supporting amount and supporting efficiency of each fragrance capsule are the same, fiber adhesion of fragrance capsules was evaluated by evaluating smell in fiber after washing.

Test Conditions

General washer evaluation: Commercially available 100% cotton towel (30*20 cm), and mixed spun cloth for evaluation of smell (30×20 cm) were prepared, and then, using a standard amount of general laundry detergent, repeatedly washed with a washer 5 times, and dehydrated, which were used as test specimens.

1% aqueous solution of the composition (microcapsules) of the invention was prepared, and then, the test specimens were treated with a rinsing course in each rinsing water (20° C.) using a standard use amount (0.67 ml/1 l wash water) in a stirred washer, and dehydrated, and then, taken out. And, the test specimens were flat dried under 20° C., 60% RH conditions for 24 hours so as not to be extended or distorted, and then, the degree of fragrance intensity was assigned from the lowest 1 point to the highest 5 point by sensory evaluation test of skilled panelists, which was repeated more than 3 times, and smell effect was measured as the average values. Other detailed test conditions follows the test method of EL306 (fabric softener) among Environmental Product Declaration standards of Korean Environmental Industry and Technology Institute.

Soak washing evaluation: Commercially available 100% cotton towel (30*20 cm) and fabric cotton standard cloth (30×20 cm) were prepared, and then, using a standard amount of general laundry detergent, repeatedly washed with a washer 5 times, and dehydrated, which were used as test specimens. In the 0.2% aqueous solution of the composition (microcapsules) of the invention, the test specimens were soaked for 10 minutes and then taken out. And, the test specimens were flat dried under 20° C., 60% RH conditions for 24 hours so as not to be extended or distorted, and then, the degree of fragrance intensity was assigned from the lowest 1 point to the highest 5 point by sensory evaluation test of skilled panelists, which was repeated more than 3 times, and smell effect was measured as the average values. Other detailed test conditions follows the test method of EL306 (fabric softener) among Environmental Product Declaration standards of Korean Environmental Industry and Technology Institute.

From the results of Table 2, it was confirmed that Examples 1 to 3 of the invention maintained excellent fiber adhesion and fragrance durability, in both washer washing and soak washing evaluations, compared to Reference Example 1.

And, as can be seen from the Table 3, previously used fragrance capsules of Comparative Examples 1 and 2 have weak fragrance supporting force, and thus, inferior fiber adhesion. And, in the case of Reference Examples 2 and 3 wherein the content of amine-based monomers used for surface modification do not fall within the range of the invention, fiber adhesion improvement effect could not be obtained. And, as explained above, in Comparative Example 3, synthesis of capsules was not properly progressed, and thus, the properties could not be evaluated.

Thus, when the surface of capsules is modified using an amine-based compound, the content of the amine-based monomers should be within a specific range, so as to obtain excellent effects in terms of both fiber adhesion and fragrance supporting force.

The invention claimed is:

1. A method for preparing microcapsules comprising the steps of:
   step 1: adsorbing acrylic monomers having water solubility of 1 to 100 g/L on surface of inorganic nanoparticles;
   step 2: adding a fragrance oil to the inorganic nanoparticles having the acrylic monomers adsorbed on the surface, thus forming an emulsion;
   step 3: polymerizing the emulsion from the step 2, thus forming a polymerization solution; and
   step 4: adding amine-based monomers and an initiator to the polymerization solution from the step 3, thus progressing polymerization.

2. The method for preparing microcapsules according to claim 1, wherein the acrylic monomers have a water solubility of 5 to 60 g/L.

TABLE 2

|  | Test specimen | Free fragrance | Example 1 Surface modified fragrance/ silica-acryl resin capsules | Example 2 Surface modified fragrance/ silica-acryl resin capsule | Example 3 Surface modified fragrance/ silica-acryl resin capsule | Reference Example 1 fragrance/ silica-acryl resin capsule |
|---|---|---|---|---|---|---|
| Washer washing: After drying | Cotton towel | 1 | 1.75 | 1.6 | 1.55 | 1.46 |
|  | Mixed spun cloth | 1 | 2.0 | 1.85 | 1.8 | 1.45 |
| Soak washing: After drying | Cotton towel | 1.5 | 2.95 | 2.9 | 2.85 | 2.82 |
|  | Cotton standard cloth | 1.5 | 3.15 | 3 | 3 | 2.35 |

TABLE 3

|  | Test specimen | Free fragrance | Comparative Example 1 fragrance/ melamine capsule | Comparative Example 2 fragrance/ ethyl cellulose capsule | Reference Example 2 The content of amine-based monomers used for surface modification is small | Reference Example 3 The content of amine-based monomers used for surface modification is excessive |
|---|---|---|---|---|---|---|
| Washer washing: After drying | Cotton cloth | 1 | 1.85 | 1.3 | 1.5 | 1.75 |
|  | Mixed spun cloth | 1 | 2.3 | 1.5 | 1.75 | 2.0 |
| Soak washing: After drying | Cotton cloth | 1.5 | 2.6 | 1.8 | 2.55 | 2.85 |
|  | Cotton standard cloth | 1.5 | 2.8 | 2.0 | 2.65 | 3.2 |

3. The method for preparing microcapsules according to claim 1, wherein the acrylic monomers include one or more of diacrylic monomers represented by Chemical Formula 1 or monoacrylic monomers represented by Chemical Formula 2:

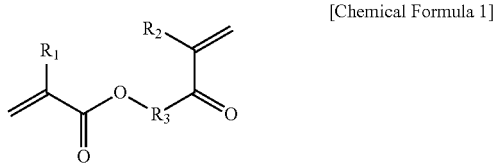

[Chemical Formula 1]

in Chemical Formula 1, $R_1$ and $R_2$ are each independently hydrogen or $-(CH_2)_nCH_3$, wherein n is an integer of 0 to 5, and $R_3$ is $-(CH_2CR_4H-O)_m$, $-(CH_2CR_4H)_mO$, or $-(CH_2CH(OH)CH_2-O)_m$, (wherein m is an integer of 1 to 5), and $R_4$ is hydrogen or $-(CH_2)_nCH_3$, wherein n is an integer of 0 to 5,

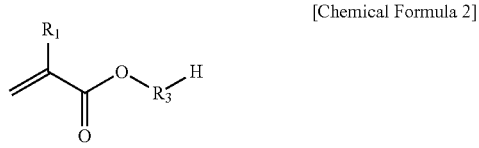

[Chemical Formula 2]

in Chemical Formula 2, $R_1$ is hydrogen or $-(CH_2)_nCH_3$, wherein n is an integer of 0 to 5, and $R_3$ is $-(CH_2CR_4H-O)_m$, $-(CH_2CR_4H)_mO$, or $-(CH_2CH(OH)CH_2-O)$, wherein m is an integer of 1 to 5, and $R_4$ is hydrogen or $-(CH_2)_nCH_3$, wherein n is an integer of 0 to 5.

4. The method for preparing microcapsules according to claim 1, wherein the acrylic monomers include one or more dipropyleneglycol diacrylate, diethyleneglycol diacrylate or tetraethyleneglycol dimethacrylate.

5. The method for preparing microcapsules according to claim 1, wherein the amine-based monomers include amine-based monomers of Chemical Formula 3 or Chemical Formula 4:

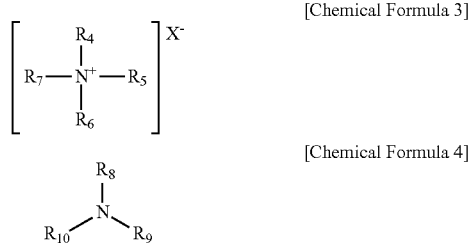

[Chemical Formula 3]

[Chemical Formula 4]

in Chemical Formulae 3 and 4, $R_4$ and $R_5$ are identical to or different from each other, and are each independently $-(CH_2)_n-(CH)=CH_2$, wherein n is an integer of 1 to 5, or $-(CH_2)_n-CH_3$, wherein n is an integer of 0 to 5, $R_6$ and $R_7$ are identical to or different from each other, and are each independently a $C_1$ to $C_5$ alkyl, $-(CH_2)_n-CH=CH_2$, wherein n is an integer of 1 to 5, an acrylamide substituent of Chemical Formula a, or an acrylic acid substituent of Chemical Formula b, provided that $R_6$ and $R_7$ are not both a $C_1$ to $C_5$ alkyl group, X is a halogen, $R_8$ is hydrogen, $-(CH_2)_n-(CH)=CH_2$, wherein n is an integer of 1 to 5, or $-(CH_2)_n-CH_3$, wherein n is an integer of 0 to 5, $R_9$ and $R_{10}$ are identical to or different from each other, and are each independently $-(CH_2)_n-CH=CH_2$, wherein n is an integer of 1 to 5, an acrylamide substituent of Chemical Formula a, or an acrylic acid substituent of Chemical Formula b,

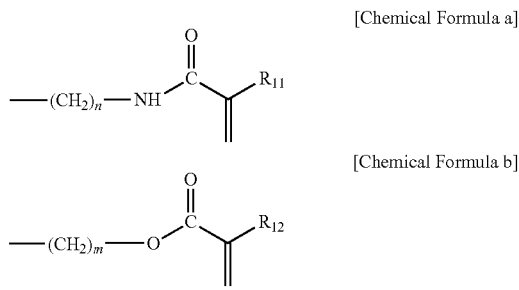

[Chemical Formula a]

[Chemical Formula b]

in Chemical Formulas a and b, n and m are each independently an integer of 1 to 5, and $R_{11}$ and $R_{12}$ are each independently hydrogen or $-(CH_2)_{n'}·CH_3$, wherein n' is an integer of 0 to 5.

6. The method for preparing microcapsules according to claim 1, wherein the amine-based monomers are included in an amount of 0.2 to 5 parts by weight, based on 100 parts by weight of the polymerization solution from the step 3.

7. The method for preparing microcapsules according to claim 1, wherein the inorganic nanoparticles have an average particle diameter of 2 nm to 100 nm, and are selected from the group consisting of silica, titania, metal oxide, noble metal, apatite, and limestone.

8. The method for preparing microcapsules according to claim 1, wherein the step 1 comprises the steps of adding the acrylic monomers to an aqueous colloidal solution of the inorganic nanoparticles, and dispersing them, to adsorb the acrylic monomers on the surface of the inorganic nanoparticles.

9. The method for preparing microcapsules according to claim 1, wherein in the step 2, the emulsion is an oil-in-water pickering emulsion.

10. The method for preparing microcapsules according to claim 1, wherein the step 2 further comprises dissolving an oil soluble initiator in the fragrance oil.

11. The method for preparing microcapsules according to claim 9, wherein the polymerization of the step 3 comprises the step of performing a radical polymerization of the oil-in-water pickering emulsion at 30° C. to 90° C. for 6 to 20 hours to form microcapsules.

12. The method for preparing microcapsules according to claim 1, wherein in the step 4, the amine-based monomers and initiator are added during the polymerization of the step 3 or after completing the polymerization of the step 3.

13. The method for preparing microcapsules according to claim 1, wherein the polymerization of the step 4 comprises the step of performing a polymerization at 30° C. to 90° C. for 6 to 20 hours, thus modifying the surface of microcapsules formed in the step 3.

14. The method for preparing microcapsules according to claim 1, wherein the microcapsules prepared comprise 0.5 to 40 wt % of the inorganic nanoparticles, 1 to 60 wt % of the acrylic monomers, 0.02 to 15 wt % of the amine-based monomers, and 10 to 90 wt % of the fragrance oil, based on the total weight of the microcapsules.

15. The method for preparing microcapsules according to claim 1, wherein the microcapsules prepared comprise a surface modified inorganic nanoparticles-acryl resin complex containing a fragrance component with an average particle diameter of 0.1 μm to 1000 μm.

16. The method for preparing microcapsules according to claim 9, wherein the oil-in-water pickering emulsion comprises, based on the total content of the emulsion, 60 to 80 wt % of water, 0.1 to 16 wt % of the inorganic nanoparticles, 0.2 to 25 wt % of the acrylic monomers, and 2 to 36 wt % of the fragrance oil.

17. The method for preparing microcapsules according to claim 1, wherein the amine-based monomers include at least one selected from (methacryloylamino)propyl]trimethylammonium chloride or a diallyldimethylammonium chloride.

18. The method for preparing microcapsules according to claim 1, wherein the amine-based monomers are included in an amount of 0.2 to 5 parts by weight, based on 100 parts by weight of the polymerization solution from the step 3, and a water soluble initiator is included in an amount of 0.004 to 0.03 parts by weight, based on 100 parts by weight of the polymerization solution of the step 3.

* * * * *